Figure 1:
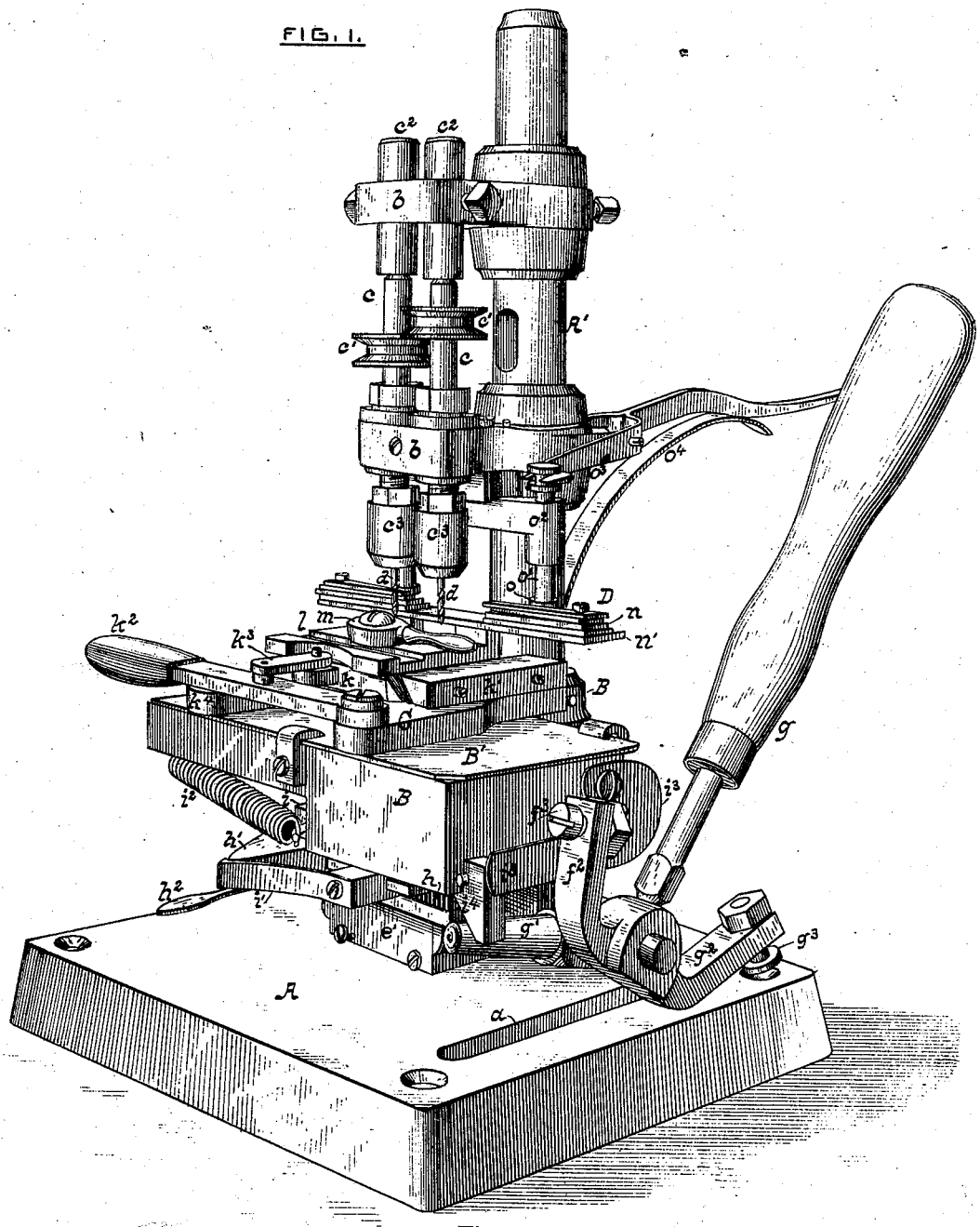

(No Model.) 4 Sheets—Sheet 1.

A. C. ESTABROOK.
MACHINE FOR BORING BRUSH HANDLES.

No. 260,377. Patented July 4, 1882.

ATTEST
INVENTOR:
Alanson C. Estabrook (No Model.)

4 Sheets—Sheet 2.

A. C. ESTABROOK.
MACHINE FOR BORING BRUSH HANDLES.

No. 260,377.   Patented July 4, 1882.

ATTEST:

INVENTOR:

(No Model.)  4 Sheets—Sheet 3.

A. C. ESTABROOK.
MACHINE FOR BORING BRUSH HANDLES.

No. 260,377.  Patented July 4, 1882.

(No Model.)  A. C. ESTABROOK.  4 Sheets—Sheet 4.
MACHINE FOR BORING BRUSH HANDLES.
No. 260,377. Patented July 4, 1882.
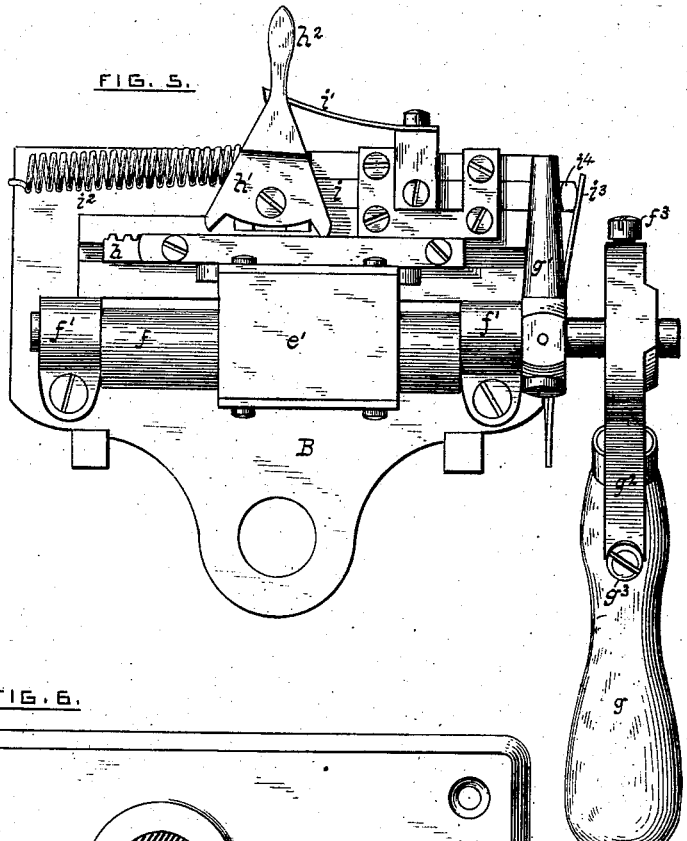
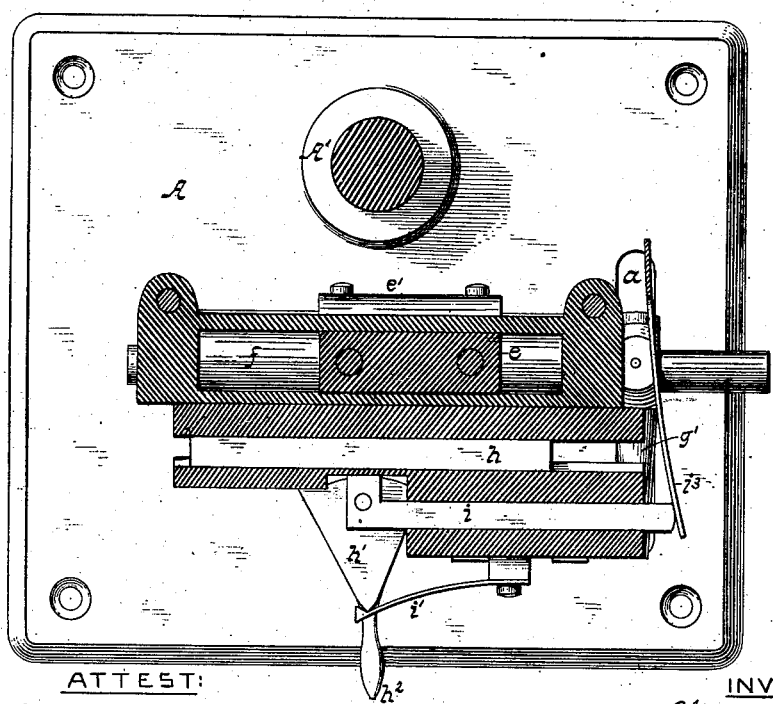

UNITED STATES PATENT OFFICE.

ALANSON C. ESTABROOK, OF FLORENCE, MASSACHUSETTS, ASSIGNOR TO THE FLORENCE MANUFACTURING COMPANY, OF SAME PLACE.

MACHINE FOR BORING BRUSH-HANDLES.

SPECIFICATION forming part of Letters Patent No. 260,377, dated July 4, 1882.

Application filed January 7, 1882. (No model.)

*To all whom it may concern:*

Be it known that I, ALANSON C. ESTABROOK, of Florence, in the town of Northampton, county of Hampshire, and State of Massachusetts, have invented certain new and useful Improvements in Machines for Boring Brush-Handles; and I do hereby declare that the following specification, taken in connection with the drawings furnished and forming a part of the same, is a clear, true, and complete description of my invention.

Although machines embodying more or less of the several features of my invention may be profitably employed in the general service indicated, I have devised the same for special service in connection with the manufacture of tooth-brush handles composed of bone or ivory.

Heretofore a variety of machines have been devised for boring the holes for bristles in large brush-backs, and in some cases gangs of drills have been therein employed; but I know of no prior organization of such mechanism adapted for use in the manufacture of tooth-brushes, and so far as my knowledge extends the boring of tooth-brush handles has always heretofore been performed by means of a machine embodying a single drill, against which the handle is forced by hand, and the eye of the workman has been alone relied upon for locating the rows of holes with reference to the edges of the brush-head for spacing the rows of holes, and also spacing the holes in each row, and therefore this operation has heretofore been comparatively slow and expensive, and the character of this line of work has been variable and worthless or objectionable in proportion to its variability. If the rows be irregular as to spacing between the rows, and also as to line, the graving or slotting subsequently performed for the reception of the bristle-wires in the back of the brush-head fails in proper coincidence with more or less of said holes, and when the bristles are mounted the brush is deficient in that uniformity which is essential to a neat finish. During this boring operation considerable loss has heretofore been experienced from faulty and irregular boring by even skilled workmen, and as this operation is next to the last one in the finishing of the handles a badly-bored head results in a loss of the material and of the labor previously expended upon the handle.

The object of my invention is to organize with one or more drills mechanism which is so far automatic as to place the operation of boring tooth-brush heads readily within the capacity of persons not previously skilled therein, and to obviate the necessity for constant calculation by the eye as to spacing, thus reducing the cost of this line of work both as to rapidity in execution and character of labor employed, and at the same time with improved results and a minimum of losses from bad drilling.

The improvements have been rendered possible by reason of certain other prior improvements made by me in the manufacture of tooth-brush handles, whereby handles are produced with such uniformity in contour and dimension of their heads that the edges thereof may be safely relied upon as gaging-surfaces for accurately mounting the heads in a machine preparatory to its automatic operation.

After describing a machine embodying all of my improvements as preferably organized by me, the features deemed novel will be specified in the several claims hereunto annexed.

Figure 2:
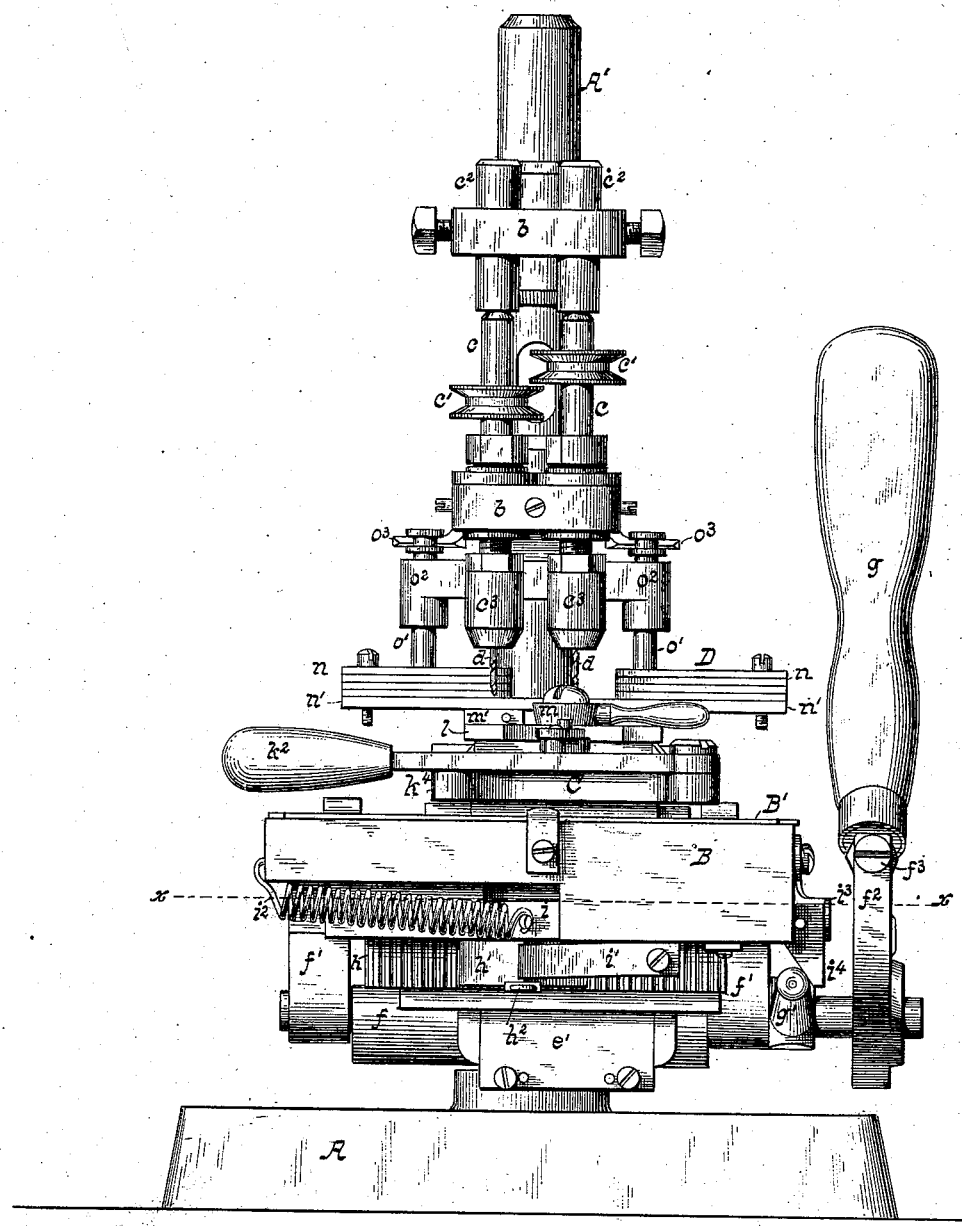
Figure 3:
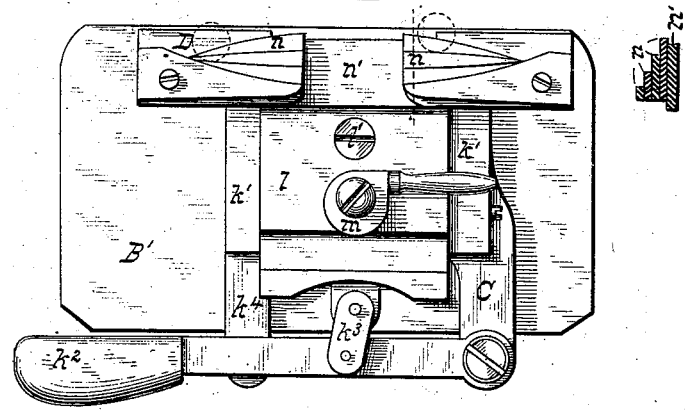
Figure 4:
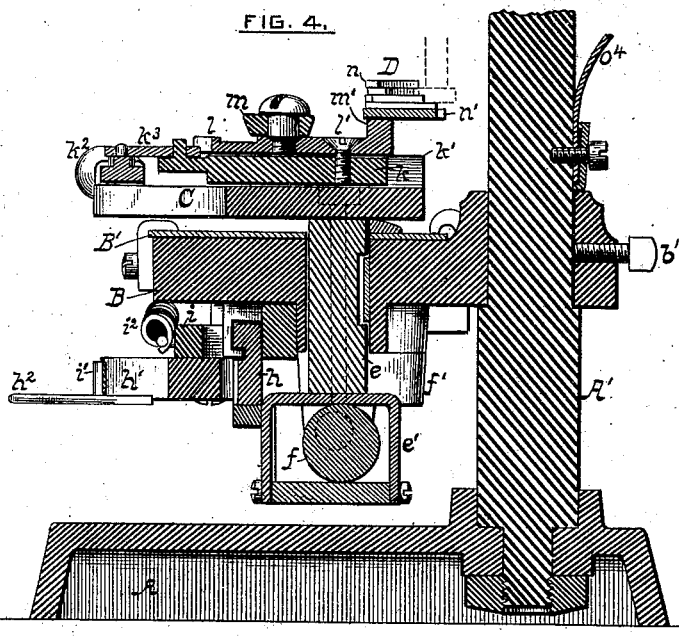

Referring to the drawings, of which there are four sheets, Figure 1, Sheet 1, is a perspective view of my machine. Fig. 2, Sheet 2, is a front elevation of the machine. Fig. 3, Sheet 3, is a plan view of the clamping-bed detached. Fig. 4, Sheet 3, is a vertical central section of the lower portion of the machine on line from front to rear. Fig. 5, Sheet 4, is an inverted view of the lower part of the machine detached from the standard. Fig. 6, Sheet 4, is a horizontal section of the machine on line *x*, Fig. 2.

The frame of the machine may be largely varied in form; but, as here shown, it consists of a bed-plate, A, slotted at *a*, and provided with holes, by which it may be securely fastened with screws or bolts to a bench or a table, and a vertical standard, A', rigidly mounted midway near the rear edge of the bed-plate.

Upon the standard A', projecting toward the front, are brackets *b*, on which are mounted the vertical drill-arbors *c*, which are provided with grooved pulleys *c'*. In the lower bracket *b* there are suitable brass boxes, and in the upper bracket there are cylindrical blocks $c^2$, adjustably secured to the bracket by set-screws, and said blocks at their lower ends are drilled for the reception of the upper ends of the drill-arbors $c$, and serve as upper boxes therefor. The lower end of each arbor is screw-threaded for receiving drill-chucks $c^3$, tapped to correspond with the threaded arbors. Both brackets $b$ are capable of vertical adjustment on the standard $A'$, each having a set-screw for securing it in position, so that the drills and their arbors may be set at any desired vertical adjustment.

Said standard $A'$ also supports a bed-bracket, B, horizontally extending toward the front, and this, too, is rendered vertically adjustable on the standard, and is provided with a set-screw, $b'$. Upon this bed-bracket the clamping-bed C is mounted, and also the mechanism by which it is properly moved to and fro horizontally beneath the drills $d$, and by which it is also raised to the drills and lowered therefrom.

Although I prefer two drills, as shown, I do not limit myself thereto except as hereinafter indicated, because a single drill may be profitably employed with certain features of my invention for enabling the boring operation to be performed by comparatively-unskilled labor more rapidly, better, and with less loss than heretofore. More than two drills may also be employed without departure from my invention; but I find that two are more conveniently operated than a greater number, because of the limited area for operation afforded by a tooth-brush head. In working with two drills it often occurs that one drill must occupy a previously-drilled hole while the other is drilling, and this is done without any liability of deforming the previously-drilled hole, because, as hereinafter shown, the clamp which holds the handle is accurately moved step by step, and because the space between the drills is accurately divided between a certain number of holes, and also because said clamp, whether moved in a straight or a curved line, always so presents a handle to the drills that the line occupied by the row of holes is truly coincident with both drills.

The bed-bracket B has a longitudinal slot therein occupied by a vertical rectangular stem, $e$, of the clamping-bed C, and at the lower end of said stem is a box, $e'$, occupied longitudinally by a cam-shaft, $f$, suspended from the bed-bracket by a hanger, $f'$, at each end thereof, and on one end of said cam-shaft is a hand-lever, $g$, provided near the cam-shaft with an arm, $f^2$, and a set-screw, $f^3$, so that when said lever is moved to and fro the clamp-bed C is lifted and lowered by the cam-shaft $f$ in contact with box $e'$, and the set-screw $f^3$ by abutting with its head on the upper surface of the bed-plate A during the forward movement of said lever limits the height to which the clamp-bed may be thus lifted, thereby limiting the depth of holes bored in a brush-head properly mounted upon the clamp-bed, and said depth of hole may be varied by advancing or retiring said set-screw $f^3$ in said arm $f^2$.

Between the clamp-bed C and the upper surface of the bed-bracket B is a thin guard-plate, $B'$, surrounding the stem $e$ of the bed C and moving therewith, which covers the slot in the bed-bracket and keeps the bone-dust and dirt from falling downward in said slot. The front and rear edges of the guard-plate are provided with edge-guides secured to bracket B, which lap over upon said plate and prevent it from rising when the clamp-bed C is lifted. Said guard-plate $B'$ also serves as a broad bearing as between the clamp-bed and the bracket B, the clamp-bed resting upon said plate during its sliding movement. The hand-lever $g$ also imparts to the clamp-bed its longitudinal movements in a line with the two drills $d$; but this is effected step by step with such accuracy of movement as to properly space the holes in any one line, and the same vibratory movement of said lever $g$ results in moving the clamp-bed in either direction, whether from right to left hand, or the reverse thereof. These movements are effected by mechanism, as follows: The stem $e$ of the clamp-bed C has above the box $e'$ (surrounding the cam-shaft) and on its front side a rack-bar, $h$, fitted at its upper edge to a guiding-groove in the under side of the bed-bracket. This rack-bar has on its outer side square-edged teeth with which the two teeth of a triangular pawl, $h'$, alternately engage, according to the direction in which the clamp-bed is to be moved. The pawl $h'$ is pivotally mounted upon a pawl-bar, $i$, mounted in slide-bearings in the under side of the bed-bracket B. The outer end of said pawl is pointed evenly with reference to a central line passing through its pivot, and is under the control of a spring-latch, $i'$, mounted horizontally upon the outer end of an arm attached to and projecting outwardly from the pawl-bar $i$. Said pawl has a handle, $h^2$, by which the pawl may be vibrated for placing either of the faces at its point in contact with the spring-latch $i'$, and thus cause either of its teeth to engage with those on the rack-bar.

The pawl-bar $i$ is moved longitudinally in one direction by means of the expansive spiral spring $i^2$, connected at one end to the under side of the bed-bracket and at its opposite end to the pawl-bar above the pawl. Against said pawl-bar, at its outer end, there also bears a flat spring, $i^3$, which is merely auxiliary to the spring $i^2$, and either may be dispensed with if the other is of proper strength and reliability. Said pawl-bar is moved longitudinally in the opposite direction by the hand-lever $g$ acting to partially rotate the cam-shaft $f$, upon which, near the hand-lever, is a rounded arm or lever, $g'$, projecting to the front and in the vertical plane occupied by an inclined cam-face on the inner side of a pendent portion, $i^4$, of the pawl-bar $i$ at its outer end, the arm $g'$ dropping into the recess $a$ in the bed-plate when the lever $g$ is thrown toward the front of the machine. The pawl-bar is limited as to its inward movement by a stop-pin which bears against the end of the bed-bracket, and the outward movement of said bar, although it should never be less than the space of one tooth of the rack-bar, may be increased by means of an arm, $g^2$, which projects rearwardly from said lever $g$ near the cam-shaft, and is provided with a set-screw, $g^3$, at its outer end, the head of which, by abutting against the upper surface of the bed-plate A, limits the rearward movement of the lever, and according as this set-screw is advanced or retired so will the outward movement of said pawl-bar be varied.

As thus far described, it will be readily understood that if the lever $g$ be vibrated to and fro with the pawl so set that its spring-latch engages with one face at the point thereof, the clamp-bed will be moved, for instance, toward the lever $g$, and that when said latch abuts against the opposite face of the pawl the same vibrations of lever $g$ will cause the clamp-bed to be moved in the opposite direction step by step, one tooth of the rack-bar at a time, or more if the pawl-bar be moved to a greater degree than is necessary for the one tooth movement. Now, when it is understood that the distance moved by the clamp-bed is equal to the desired space between the holes to be bored, it will be obvious that the holes will be properly spaced and exactly in line with each other, whether in a straight line or in a curved line, as also provided for by me, and that the drilling may proceed by moving the bed in one direction for one row of holes and by moving the bed back in the opposite direction for another row, provision being duly made by me for properly spacing the rows.

While I deem the double-acting hand-lever a desirable medium for lifting the clamp, I do not preclude myself from employing a treadle for that purpose, or for the equivalent lowering of the drill-spindle to a clamp having no vertical movement. In either case a spring or springs can be successfully employed to work oppositely to the treadle, and said treadle being provided with an adjustable stop for precisely limiting the upward movement of the clamp or the downward movement of the drills, the same accuracy of operation would be involved as to depth of hole bored. Neither do I preclude myself from employing a treadle for imparting the step-by-step movement to the clamp-bed, because with two treadles alternately operated precisely the same movement can be readily obtained, leaving both hands of the attendant free to manipulate the double-acting pawl and the hand-lever. I also fully recognize the fact that mechanical power may be profitably employed for actuating the lever $g$ or the treadles, as suggested, it only being necessary in that connection to use well-known means for readily throwing the mechanism in and out of gear.

The upper portion of the clamp-bed C is complex in its construction, and embodies a transverse sliding plate, $k$, fitted between suitable side guides, $k'$, a horizontal hand-lever, $k^2$, pivoted at one end to an arm on the clamp-bed, and linked at $k^3$ to the front end of the sliding plate $k$.

Upon the top of the sliding plate is a horizontal swiveled clamp-plate, $l$, pivoted at the rear of its center to the sliding plate at $l'$, so that it is free to swing to and fro in a horizontal plane. Pivoted upon the top of this clamp-plate is a horizontal cam-lever, $m$, located opposite the center of a vertical clamping-flange, $m'$, preferably cut away centrally, so as to be readily engaged laterally either by the curved or the straight edge (as the case may be) of a brush-handle head. Said flange $m'$ is therefore really in two parts, separated by said open space.

The cam-lever $m$ and said divided flange or flanges $m'$ constitute a clamp, which, when used for clamping handle-heads of uniform contour and dimensions, will clamp them all precisely alike, and present all in precisely the same manner to the drills. This clamp may be variously constructed; but it is important that it engage edgewise with the head of a handle and firmly confine it without interfering with the operation of the drills.

The spacing and lining of the rows of holes are effected by the hand-lever $k^2$, subject to the absolute gaging effect of a gage, D. As here shown, this gage is arranged for spacing holes occupying curved lines—as, for instance, in a head having four curved lines of bristle-holes the two outer rows occupy reversely-curved lines in the arc of a circle of a given diameter, and the two inner rows occupy reversely-curved lines in the arc of a circle of a lesser diameter, and therefore said gage is not only a row-gage for spacing the rows with reference to each other, but also a line-guide for determining the exact lines the rows of holes shall occupy. If used for drilling straight rows of holes, the clamp-plate need not be pivoted, and in that case the gage would serve merely as a row-spacing medium; but the pivotal feature is necessary for drilling curved rows, and it may also be employed in drilling straight rows, and in both of these cases the gage serves not only as a row-gage for spacing, but also as a line-guide for assuring the character of the lines the rows of holes are to occupy. This gage D is rigidly mounted upon the clamp-plate on top of the clamp-flanges $m'$. It is composed of a series of leaves, $n$, mounted one above the other, with edges set back of each other progressively from the edge of the lower leaf, as clearly indicated in the sectional view annexed to Fig. 3. As here shown, the leaves are curved, and thereby adapted to guide for curved lines. Two sets of leaves are here employed, one at each end of the gage, with an intervening space between the sets. The distance between the edge of one leaf and the edge of the leaf next above or below is exactly equal to the distance or space between the curved rows of holes desired, measuring from the center of a hole in one row to the center of the opposite hole in the next adjacent row. For boring straight rows of holes these leaves $n$ would have straight edges, be spaced as described, and need not be in two sets, but in one set extended from end to end of the gage. For curved-line boring the curved leaves may also be in one instead of two sets, if desired. These leaves are detachably mounted upon a ledge-plate, $n'$, thus providing for their ready removal and the substitution of others.

Co-operating with the gage D, and constituting, in fact, a part thereof, are two vertical abutments, $o$, each in the form of a disk, horizontally mounted at the lower end of a spindle, $o'$, and housed in a guide, $o^2$, connected with the lower bracket $b$. Both of these abutments are suspended from the front end of a forked lever, $o^3$, pivoted to the standard A' and extended rearward, so that an upwardly-set spring, $o^4$, may normally force the rear end of said lever upward and the abutments $o$ downward, said spring being firmly seated at its foot against the rear side of the standard A'.

As thus described, it will be readily seen that if the abutments $o$ rest with spring force applied thereto upon the surface of the leaves $n$ next to the top leaves, and pressure be applied by the hand to hand-lever $k^2$ to hold the gage firmly inward, the edges of the top leaves $n$ will be in guiding abutting contact with the abutments $o$ during the longitudinal intermittent movement of the clamp-bed in either direction, thus causing the clamp-plate to swing horizontally on its pivot and progressively present the head of a handle to the drills in a curved line.

It will also be readily seen that after one line be thus drilled the slight withdrawal of the hand-lever $k^2$ and gage D will cause the abutments to drop (by their spring-pressure) upon the next lower leaves, whereupon the clamp-bed, on being intermittingly moved backward, will cause another curved row of holes to be drilled, slight inward pressure on said hand-lever being meantime maintained as before, and so on until the last row of holes has been drilled, the abutments during that operation resting upon the ledge $n'$ next below the lowest leaf $n$, and in guiding contact with the edge of said leaf. After this the abutments are raised and the clamp-plate advanced for properly receiving the abutments on the second leaf from the top, ready for operation upon another brush-handle.

In boring straight holes with the clamp-plate immovable with reference to the transverse sliding plate $k$, the gage for spacing the rows of holes need not be of the construction shown—as, for instance, the projecting arm $k^4$ of the clamp-bed adjacent to the handle of the hand-lever $k^2$ may be provided with gage-marks to indicate the proper location of a row of holes with reference to a row already bored, in which case no guiding function in the gage would be necessary, because the clamp-bed proper is limited to a straight-line movement.

It is to be understood that the distance between the centers of the two drills constitutes a space which is divisible into equal divisions, as marked off by the rack-bar. As preferred by me, said space is suitable for the location of six holes regularly spaced; but this may be varied, if desired, and if the holes be drilled farther apart the space should be equally divided between them.

The longitudinal movement of the clamp-bed may be readily effected by a partial vibration of the hand-lever without lifting said clamp-bed, and this capacity enables the location of the brush-head at any desired position with relation to the drills without bringing the latter into action.

The double-acting pawl, if held by one hand so that neither of its teeth are in engagement with the rack-bar, enables the clamp-bed to be moved to and fro by the pressure of the other hand applied directly thereto.

An end gage may be employed, if desired, for assuring endwise location of a handle in the clamp; but this will seldom be requisite, because one side edge of the clamp-bed will serve as a ready guide to the eye for properly clamping the handle.

The operation of the machine will be readily comprehended from the description already given of the several parts and of their particular operation, which has been not only separately described, but also in conjunction with their co-operative parts, and it is only deemed necessary to now briefly state that the brush-handle is inserted into the clamp from the side opposite to hand-lever $g$, and that a row of holes may be commenced by either drill, the feeding movement being toward the other.

At the rear end of the head, adjacent to the narrow shank of a handle, it is advisable, as heretofore, to avoid weakening the stock by too many holes, and therefore, while the outer rows will be complete and uniform, the regular spacing of the one or two terminal holes of the inner rows at the shank is departed from, although they should be located in line with the others in the row to which they may belong.

At the round end of a curved-sided head the two central rows are located beyond the initial holes of the two outer rows, thus forming a symmetrical merging of the outer and inner rows at said outer end.

Although I prefer to employ a machine organized in full as shown, I do not limit myself thereto, because certain features may obviously be separately employed with substantially valuable and improved results—as, for instance, the two drills, or even one drill, in combination with a clamp, a sliding bed, and a gage, may be profitably employed without the step-by-step mechanism, the movements of the bed being effected by the hand, and the eye relied upon for spacing the holes in a row. In this case the lining of the rows would be accurately assured as well as the spacing of the rows.

The value of other embodiments of separate features of my invention will be obvious.

While I prefer that the clamp-bed be lifted to and from the drills, I do not limit myself to that construction, except as hereinafter indicated, because, as hereinbefore stated, their arbors may readily be mounted in a vertically-sliding frame and readily be made to descend with accurate limitation, and to rise at proper intervals, governed by the step-by-step movements of the bed.

Numerous other variations in construction and arrangement of the several parts may be obviously made without materially affecting the results, nor departing from my invention.

Having thus described my invention, I claim as new and desire to secure by Letters Patent—

1. In a machine for boring brush-handles, the combination, substantially as hereinbefore described, of one or more drills, a swiveled sliding clamp, and a curved line-gage which controls the movements of the clamp with relation to the drills.

2. In a machine for boring brush-handles, the combination, substantially as hereinbefore described, of one or more drills, a sliding clamp, and means, substantially as described, by which it is intermittingly moved longitudinally both forward and backward beneath the drills and intermittingly raised to and lowered from said drills, and a gage for determining the lines occupied by the rows of holes and for spacing said rows.

3. In a machine for boring brush-handles, the combination, substantially as hereinbefore described, of one or more drills, a sliding clamp, a gage for spacing rows of holes, and mechanism, substantially as described, whereby by means of a single lever said clamp is intermittingly moved step by step beneath the drills, and lifted to and lowered from said drills after each step.

4. The combination, with the clamp-bed and the clamp mounted on said bed, of a cam for lifting the bed, a pawl-bar and its spring, a pawl on said bar, a rack-bar on said bed, and a lever for rocking said cam and reciprocating said pawl-bar.

5. The combination, with the clamp-bed, its lifting-cam, and its pawl-bar, spring, and pawl, of a lever for rocking said cam and vibrating the pawl-bar, and adjusting-screws for variably limiting the lift of the clamp-bed and the extent of its step-by-step movement.

6. In a machine for boring tooth-brush handles, the combination, substantially as hereinbefore described, of two or more drills, a gage for spacing rows of holes, a clamp for holding the handle, and mechanism, substantially as described, for moving said clamp with relation to the drills step by step in a predetermined line, whereby either of said drills may occupy a hole previously drilled during the drilling of a hole by another drill, as set forth.

7. The combination, with one or more drills, a sliding clamp-bed, and a clamp, of a gage composed of leaves mounted one above the other, and an abutment forced longitudinally by a spring for successive engagement with the edges of said leaves, substantially as described.

ALANSON C. ESTABROOK.

Witnesses:
  H. K. PARSONS,
  G. S. JOHNSON.